United States Patent
Horst et al.

(10) Patent No.: US 9,147,093 B2
(45) Date of Patent: Sep. 29, 2015

(54) METHOD FOR IMPLEMENTING AND OPERATING, AND A READ/WRITE UNIT, FOR A SYSTEM INCLUDING MULTIPLE WIRELESSLY READABLE TRANSPONDERS

(75) Inventors: Dieter Horst, Cadolzburg (DE); Jörg Neidig, Nürnberg (DE); Markus Weinländer, Happurg (DE)

(73) Assignee: Siemens Aktiengesellschaft, Munich (DE)

( * ) Notice: Subject to any disclaimer, the term of this patent is extended or adjusted under 35 U.S.C. 154(b) by 93 days.

(21) Appl. No.: 13/594,545

(22) Filed: Aug. 24, 2012

(65) Prior Publication Data

US 2013/0049937 A1    Feb. 28, 2013

(30) Foreign Application Priority Data

Aug. 25, 2011   (EP) ..................................... 11006951

(51) Int. Cl.
*G01S 1/00*      (2006.01)
*G06K 7/00*      (2006.01)
*G06K 7/10*      (2006.01)

(52) U.S. Cl.
CPC .......... *G06K 7/0008* (2013.01); *G06K 7/10118* (2013.01); *G06K 7/10128* (2013.01); *G06K 7/10366* (2013.01)

(58) Field of Classification Search
CPC ....................... G06K 7/10128; G06K 7/10366
USPC ................. 340/10.1, 10.4, 10.5; 235/375, 376
See application file for complete search history.

(56) References Cited

U.S. PATENT DOCUMENTS

| | | |
|---|---|---|
| 8,002,181 B2 | 8/2011 | Ulrich et al. |
| 2005/0200457 A1* | 9/2005 | Bridgelall et al. ........... 340/10.3 |
| 2006/0033609 A1* | 2/2006 | Bridgelall .................. 340/10.42 |
| 2007/0055470 A1* | 3/2007 | Pietrzyk et al. ............... 702/104 |
| 2008/0042807 A1 | 2/2008 | Park et al. |
| 2009/0101712 A1* | 4/2009 | Ulrich et al. .................. 235/383 |
| 2009/0295545 A1* | 12/2009 | O'Haire et al. ............. 340/10.5 |
| 2011/0095871 A1* | 4/2011 | Kail et al. .................... 340/10.6 |

FOREIGN PATENT DOCUMENTS

| | | |
|---|---|---|
| CN | 1808462 | 7/2006 |
| CN | 101836218 | 9/2010 |
| WO | WO 2009/055839 | 5/2009 |

* cited by examiner

*Primary Examiner* — Andrew Bee
(74) *Attorney, Agent, or Firm* — Cozen O'Connor

(57) ABSTRACT

A method for configuring and operating a read/write unit connected to an industrial control device in a system including multiple transponders having unique identification numbers, the read/write unit. During a recognition phase, a plurality of the transponders are detected, at least two of the transponders are repeatedly detected, and during each detection, the unique identification number of each detected transponder and a number of features relating to each detection of that transponder are registered. During an evaluation phase, the registered features are evaluated statistically for each detected transponder, statistical variables are determined for each detected transponder, and the statistical variables are respectively filtered using filter criteria. The unique identification number of one of the detected transponders that meets the filter criteria is reported to the industrial control device as a detected transponder to provide unambiguous identification of the closest transponder to the read/write unit, even in densely packed surroundings.

4 Claims, 2 Drawing Sheets

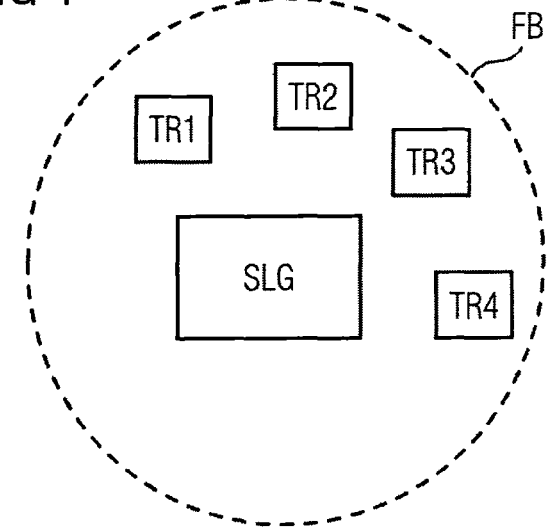

METHOD FOR IMPLEMENTING AND OPERATING, AND A READ/WRITE UNIT, FOR A SYSTEM INCLUDING MULTIPLE WIRELESSLY READABLE TRANSPONDERS

BACKGROUND OF THE INVENTION

1. Field of the Invention

The present invention relates to a method for implementing and operating a read/write unit in a system that includes multiple wirelessly readable transponders, and to such a read/write unit implementing the said method.

2. Description of the Related Art

By means of Radio Frequency Identification (RFID) technology, RFID labels, which are commonly designated transponders or "tags", are registered and read wirelessly by read/write units ("readers"). The transponders are normally activated by an electromagnetic field, which is generated by a read/write unit by emitting a carrier wave with sufficient transmitted power, and are typically also supplied with energy (passive transponders). Transponders are also known in which the energy supply of the transponder is provided by a dedicated power supply, such as batteries (i.e., active transponders).

RFID technology is generally used where objects, such as workpieces or dispatch items, are intended to be registered and identified unambiguously via radio in the surroundings or proximity of a read/write unit. For this purpose, a read/write unit is able to store information, which comprises at least one unique identification number, on the transponder via radio and to re-read the stored information. In a working environment, e.g., in industrial automation systems, the read/write unit is often connected to a control unit (e.g., an industrial controller "PLC" or personal computer).

In particular, when RFID technology is used in industrial production plants, there is often a need to identify unambiguously exactly that object and therefore exactly that transponder which is located in the immediate vicinity of the read/write unit, in order to then perform appropriate fabrication steps on the object. On the other hand, in such industrial automation surroundings, remote-field RFID systems, as they are known, are frequently used, which systems typically permit the detection of transponders located within a range or area of several meters around a read/write unit. In densely packed surroundings, when a plurality of objects with their associated transponders are located close to one another, it frequently therefore occurs that an RFID read/write unit simultaneously detects a plurality of transponders in its acquisition range. Consequently, in addition to the transponder located closest to the read/write unit and the antenna of the read/write unit, still additional transponders are detected. In this case, an unambiguous assignment of the object to be processed or to be handled at this time is no longer possible, so that errors can occur in downstream processes.

In order to solve this problem, it is known to reduce the transmitted power of the read/write unit such that, on account of the lower range associated with the reduction in transmitted power, only a maximum of one single transponder is recognized. In such cases, it has proven to be disadvantageous that the transmitted power falls to such an extent or has to be reduced to such an extent that, in many cases, the desired ("correct") transponder can no longer be reliably detected and recognized. Particularly where, because of the process, there is a relatively long time interval between reading and writing data to and from the same transponder, it is not possible to ensure that the "correct" transponder is recognized/detected clearly at both times and that unambiguous communication with this particular transponder is possible in each case.

A similar solution, which is often associated with a reduction in the transmitted power as described, is to configure the radio range with insulating plates and reflectors such that the radio range is restricted to the appropriate workstation, and thus the undesired detection of objects further away and the transponders thereof is prevented. However, this is often difficult to effect in the specific instance and commonly leads to higher costs.

Another strategy for solving the above-described problem resides in permitting simultaneous detection and simultaneous operation of a communications relationship with a plurality of transponders. Here, by means of a control device with which the read/write unit is linked, appropriate evaluation logic is implemented, by which the multiplicity of simultaneously existing communications relationships are managed and by which it is ensured that the operations assigned to the "correct" (i.e., normally the closest) transponder are performed at an appropriate processing station or the like. However, the disadvantage of this is that the corresponding processing logic for concurrently managing a plurality of communications relationships must be integrated into the logic of a process control system and, these systems often being proprietary in nature, such processing logic must be implemented in the corresponding control device on a case-by-case basis matched to the specific situation.

SUMMARY OF THE INVENTION

It is therefore an object of the present invention to provide a method for implementing and operating, and a read/write unit, with which in systems in which multiple transponders are located in the radio range of the read/write unit, unambiguous determination of a specific, closest one of the transponders is possible.

This and other objects and advantages are achieved in accordance with the invention for transponders located within the radio range of the read/write unit which are repeatedly detected by the read/write unit, i.e., multiple performance of the "inventory" is determined. In each case, in addition to the transponders recognized (detected), additional information is also stored in relation to each of the transponders, i.e., features of the radio link, such as the respectively measured received field strength (i.e., the received signal strength indication "RSSI"), the transmitted power of the read/write unit during the respective procedure, the antenna used (in the case of read/write units having a plurality of antennas) and/or the detection time (i.e., time stamp). These determined features are processed and combined statistically for each of the transponders detected and subsequently evaluated by using previously determined and/or stored filter criteria, where a transponder counts as validly detected only when the statistically processed or combined features thereof satisfy previously-defined limiting values.

In accordance with the invention, a method is provided for implementing and operating a read/write unit in a system or configuration that includes multiple wirelessly readable transponders, where each of the transponders includes a unique identification number, the read/write unit is connected to an industrial control device and, in a recognition phase, a plurality of the transponders are detected by the read/write unit. In the recognition phase, at least two of the transponders are detected repeatedly, during each detection of each transponder, where in each case the identification number and a number of pre-determined features (RSSI, SL, ANT, TIME) relating to the recognition procedure are registered, in an evaluation phase, for each of the transponders detected, the features are respectively evaluated statistically, statistical variables are determined for each of the transponders, the statistical variables determined for the respective transponders are filtered using filter criteria, and the identification number(s) of that or those of the transponders which meet the filter criteria are reported to the control device as detected transponder(s). The method of the invention ensures unambiguous identification of the nearest transponder, even in densely packed surroundings. For the filtering of over-ranges, it is not necessary to fall back on the logic of a process control system or on manual actions. In addition, the inventive method represents a generically usable solution for many problems in multiple different applications.

It is also an object of the invention to provide a read/write unit for use in a system that includes multiple wirelessly readable transponders, where the read/write unit is configured to perform the above-described identification procedure in accordance with the invention. By means of this read/write unit, the same aforedescribed advantages attained in using the method can be realized.

In an advantageous embodiment, exactly one transponder is reported to the control device as "detected". If a plurality of transponders are considered or no transponder at all can be identified, it is the intention for a message to be suppressed and for an error message to be output. The effect of this is that a connected control device is always able to operate with a unique allocation result without having to perform subsequent filtering.

If, following the first filtering, more than one transponder is considered to be located within the radio range, further processing is advantageously performed, where the determined statistical variables of the various transponders are related and compared with one another. Here, the intention is to select and report that single transponder that surpasses the other transponders, at least with regard to one variable or one feature. Provision can advantageously be made for a transponder to be reported only when it differs substantially, i.e., considerably, from the other transponders, at least with regard to one feature, which means that, with regard to at least one feature, there must be a "minimum distance" from the next "poorer" transponder.

As limiting values for the filter criteria and also for the minimum distances described with respect to the features, values can be administered manually but, alternatively, also defined by "learning" in a trial operation. The statistical variables can also be evaluated by a trained neural network, for example, for this purpose.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments in accordance with the invention will be explained below by reference to the accompanying drawings, in which:

FIG. 1 is a schematic block diagram illustrating a system that includes a read/write unit and four transponders within its radio range in accordance with the invention;

FIG. 2 is a schematic block diagram illustrating by way of example features stored in a read/write unit during the detection of transponders in a plurality of detection procedures ("inventories") in accordance with the invention.

DETAILED DESCRIPTION OF THE PREFERRED EMBODIMENTS

Figure 3:
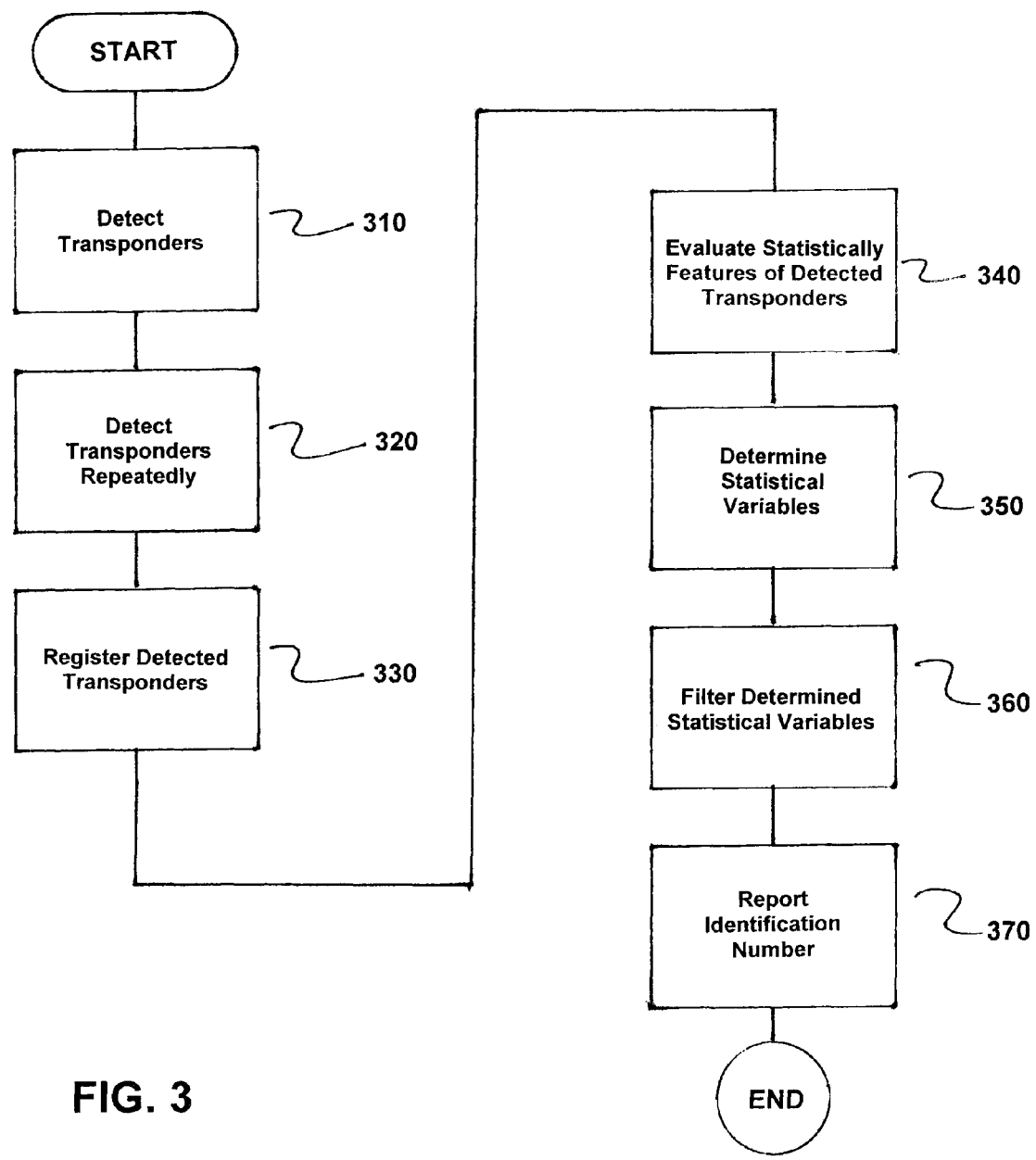
FIG. 3 is a flowchart of a method in accordance with the invention.

FIG. 1 shows transponders TR1, . . . , TR4 arranged within the maximum radio range FB of a read/write unit SLG.

FIG. 2 is a schematic block diagram depicting features stored in a read/write unit SLG during the detection of transponders in a plurality of detection procedures ("inventories") to identify a particular transponder TR1, . . . , TR4 located closest to the read/write unit SLG, in order to identify and report the identification number ID1, . . . ID4 thereof to a control device (not illustrated) of a processing station or the like.

Firstly, during a recognition phase, the read/write unit SLG continuously performs recognition procedures (i.e., "inventories"), in each of which all of the transponders TR1, . . . , TR4 located within the radio range FB are detected. This recognition phase can last for a defined time period; alternatively, the number of recognition cycles (inventories) can be defined.

In each of the "inventories", with regard to each transponder TR1, . . . , TR4 detected, "features" are detected and stored as additional information, and are stored in the read/write unit SLG in a table, for example, as illustrated in FIG. 2, or in another suitable or appropriate way. FIG. 2 shows an example in which three inventories IV1, IV2, IV3 have been performed, three tables TIV1, TIV2, TIV3 for the features having been created. By way of example, in FIG. 2, in each case a time stamp TIME of the receipt of the respective response message from the transponder TR1, . . . , TR4 and therefore of the inventory, a current receiving level RSSI (received signal strength indication), a transmitted power SL and the antenna ANT used during the reception have been detected as features. In the present example, it is assumed that three antennas ANTx.1, ANTx.2 and ANTx.3 are used. In each case, in an advantageous embodiment, in particular to save storage space and to facilitate subsequent processing, the information (i.e., features) can also be combined or aggregated, for example, in that for each of the transponders TR1, . . . , TR4 only two time stamps TIME, i.e., that of the first and that of the last detection of the respective transponder TR1, . . . , TR4, may be stored, or only the absolute number of inventories in which the transponder has been recognized, or only the respectively minimum and maximum RSSI values and the average RSSI value, etc.

Following the end or completion of the recognition phase (detection phase), an evaluation of the collected data is performed. In one embodiment, however, the evaluation may begin during the recognition phase; however, this alternative is appropriate only when, during the aforementioned time period, a sufficient number of inventories IV1, IV2, IV3 could be performed—otherwise, the data (features) cannot reliably be statistically evaluated. The data detected is then evaluated statistically such that statistical variables are formed as characteristic values for the quality of recognition of the individual transponders TR1, . . . , TR4.

Important statistical variables in this evaluation are, by way of example:

$$\text{Variance of the RSSI value} \quad \sigma = \sum_k (RSSI(k) - RSSI_{mean})^2$$

$$\text{Root mean square error} \quad e = \sqrt{\sum_k (RSSI(k+1) - RSSI(k))^2}$$

Average ratio between RSSI and transmitted power

Longest sequence of inventories in which the transponder was recognized; and so on.

If there is a variable number of inventories on which the evaluation is based, it may be expedient to divide the variance or the root mean square error by the number of inventories k.

For the variables considered during the evaluation, in each case limiting values are defined in the read/write unit SLG, a transponder TR1, . . . , TR4 counting as reliably detected only when all of the variables exceed the respective limiting value. In an alternative embodiment, the read/write unit SLG can also be programmed such that a limiting value must be exceeded only for selected ones of the variables. Both the selection as to which variables must be "satisfied" and the particular limiting values can also be learned or trained by learning phases ("teach-ins") as an alternative to manual input or definition. For this purpose, in a practical application, one may arrange what are known as "test scenarios", the read/write unit SLG automatically setting and at the same time defining the limiting values (threshold values) such that only a specific one of the transponders TR1, . . . , TR4 used test-wise is filtered out and reported.

The limiting values therefore constitute a filter criterion that is applied individually to each detected variable from each detected transponder TR1, . . . , TR4. In addition to the absolute filter criteria, it is additionally or alternatively contemplated to use relative filter criteria. Consequently, in each case the transponder TR1, . . . , TR4 having the best "quality" will be selected. In the ideal case, that transponder TR1, . . . , TR4 which is located closest to the read/write unit SLG or to the antenna(s) of the read/write unit SLG exhibits the best values for all variables. However, evaluation scenarios are also anticipated in which the detected, valid transponder TR1, . . . , TR4 will as expected be "better" than the other transponders TR1, . . . , TR4 only in a predominant or predetermined number of the variables.

In addition to the filter criteria, it is possible to determine that what is known as a "minimum distance" with respect to the variables must be present as among the transponders TR1, . . . , TR4. In this case, only when, with respect to at least one of the statistical variables, there is a minimum absolute or relative difference between the "best" and the "second best" of the transponders TR1, . . . , TR4, will the favored transponder TR1, . . . , TR4 be selected and reported to the control device. In principle, a plurality of transponders TR1, . . . , TR4 may actually be located in close proximity to the antenna or the antennas of the read/write unit SLG and, in that event, a plurality of the transponders TR1, . . . , TR4 can also correctly be reported to the control device. However, in such a case the read/write device SLG may alternatively output an error message, with an actual report being made only when exactly one of the transponders TR1, . . . , TR4 is identified and established as a result of the filtering and selection process.

In the following text, by way of example, that situation in which the transponders TR1 and TR2 are found within the radio range FB of the read/write unit SLG will be discussed.

Here, RSSI_mean is the mean value of the received field strength values of the respective transponder TR1, . . . , TR4. For the configuration of the read/write unit SLG, the following applies:

Filter criterion: RSSI_mean>85 and e<1.0,

Minimum distance: a_RSSI_mean>5, a_e>0.1.

In a first case, the following statistical variables are by way of illustration determined in an evaluation phase:

RSSI_mean(TR1)=86, e(TR1)=0.99,

RSSI_mean(TR2)=84, e(TR2)=1.1.

This means that TR1 satisfies the limiting value but TR2 does not. The distance between the transponders TR1, TR2 (RSSI_mean(TR1)−RSSI_mean(TR2)<a_RSSI_mean) falls below the minimum. Therefore, neither of the transponders TR1, TR2 is deemed to be valid. An error message is therefore output and an error code is transmitted to the control device.

In a second case with the same configuration, the statistical variables determined during the evaluation are:

RSSI_mean(TR1)=110, e(TR1)=0.7,

RSSI_mean(TR2)=95, e(TR2)=0.8.

Here, both transponders TR1, TR2 satisfy the limiting values, so that more than one transponder TR1, TR2 is determined as valid, and an error is likewise output. In principle, in such an event the filter criterion can be widened; the transponder TR1, TR2 that has the best "quality" (for example RSSI mean value) is then always selected, in this case the transponder TR1.

In a third case with the same configuration, the statistical variables determined are:

RSSI_mean(TR1)=110, e(TR1)=0.7,

RSSI_mean(TR2)=78, e(TR2)=0.9.

Here, only the transponder TR1 satisfies the limiting value. In addition, the minimum distance between TR1 and TR2 is satisfied. Therefore, exactly one transponder satisfies the filter criteria, so that the transponder TR1 is reported to the control device as "detected".

FIG. 3 is a flowchart of a method for configuring and operating a read/write unit in a system that includes a plurality of wirelessly readable transponders each having a unique identification number, where the read/write unit is connected to a control device. The method comprises detecting, by the read/write unit, the plurality of wirelessly readable transponders in a recognition phase, as indicated in step 310.

At least two transponders of the plurality of transponders are repeatedly detected during the recognition phase, as indicated in step 320. During each detection of each transponder of the plurality of transponders, the unique identification number of the detected transponder and a number of features relating to each detected transponder of the plurality transponders are registered, as indicated in step 330.

During an evaluation phase, the number of features for each respective detected transponder of the plurality of transponders are statistically evaluated, as indicated in step 340. Statistical variables are then determined for each detected transponder of the plurality of transponders, as indicated in step 350.

The determined statistical variables for each detected transponder of the plurality of transponders are filtered using filter criteria, as indicated in step 360. The unique identification number of at least one detected transponder of the plurality of transponders that meets the filter criteria as the at least one detected transponder is then reported to the control device, as indicated in step 370.

While there have been shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for configuring and operating a read/write unit in a system that includes a plurality of wirelessly readable transponders each having a unique identification number, the read/write unit being connected to a control device, the method comprising the steps of:
   detecting, by the read/write unit, the plurality of the wirelessly readable transponders in a recognition phase;
   detecting repeatedly at least two transponders of the plurality of transponders during the recognition phase;
   registering, during each detection of each transponder of the plurality of transponders, the unique identification number of the detected transponder and a number of features relating to the detected transponder;
   evaluating statistically, during an evaluation phase, the number of features for each respective detected transponder of the plurality of transponders;
   determining statistical variables for each detected transponder of the plurality of transponders, said statistical variables comprising at least one of (i) a variance of a received signal strength indication (RSSI) value, (ii) a root mean square error, and (iii) an average ratio between the RSSI value and transmitted power;
   filtering the determined statistical variables for each detected transponder of the plurality of transponders using filter criteria; and
   reporting to the control device the unique identification number of at least one detected transponder of the plurality of transponders which meets the filter criteria as the at least one detected transponder;
   wherein if the statistical variables determined from more than one detected transponder of the plurality of transponders satisfy the filter criteria, then the statistical variables determined from the more than one detected transponder are compared and related to each other; and
   wherein if the statistical variables determined for one detected transponder of the plurality of detected transponders surpass the statistical variables of other detected transponders of the plurality of detected transponders, at least with respect to one of the filter criteria, then the one detected transponder of the plurality of detected transponders is reported to the control device.

2. The method as claimed in claim 1, wherein exactly one transponder of the plurality of detected transponders is reported to the control device as detected.

3. The method as claimed in claim 1, further comprising the steps of:
   performing a check before the report of the detected transponder of the plurality of detected transponders to determine whether a minimum distance between the statistical variables determined from the one detected transponder of the plurality of detected transponders and the other detected transponders of the plurality of detected transponders, at least with regard to at least one of the filter criteria, is satisfied; and
   suppressing the report of the detected transponder of the plurality of detected transponders if the at least one of the filter criteria is unsatisfied.

4. A read/write unit for use in a system that includes a plurality of wirelessly readable transponders, wherein the read/write unit is configured to:
   detect the plurality of wirelessly readable transponders in a recognition phase;
   detect repeatedly at least two transponders of the plurality of transponders during the recognition phase;
   register, during each detection of each transponder of the plurality of transponders, the unique identification number of the detected transponder and a number of features relating to the detected transponder;
   evaluate statistically, during an evaluation phase, the number of features for each respective detected transponder of the plurality of transponders;
   determine statistical variables for each detected transponder of the plurality of transponders, said statistical variables comprising at least one of (i) a variance of a received signal strength indication (RSSI) value, (ii) a root mean square error, and (iii) an average ratio between the RSSI value and transmitted power;
   filter the determined statistical variables for each detected transponder of the plurality of transponders using filter criteria;
   report to a control device the unique identification number of at least one detected transponder of the plurality of transponders which meets the filter criteria as the at least one detected transponder;
   comparing and relating the statistical variables determined from more than one detected transponder to each other if the statistical variables determined from more than one detected transponder of the plurality of transponders satisfy the filter criteria; and
   reporting the one detected transponder of the plurality of detected transponders to the control device if the statistical variables determined for the one detected transponder of the plurality of detected transponders surpass the statistical variables of other detected transponders of the plurality of detected transponders, at least with respect to one of the filter criteria.

* * * * *